United States Patent [19]

Misencik

[11] 4,015,169

[45] Mar. 29, 1977

[54] TWO POLE GROUND FAULT CIRCUIT INTERRUPTER WITH IMPROVED RECTIFIED SUPPLY AND TRANSIENT SUPPRESSION FOR A TRIP CIRCUIT

[75] Inventor: John J. Misencik, Shelton, Conn.

[73] Assignee: Westinghouse Electric Corporation, Pittsburgh, Pa.

[22] Filed: Mar. 14, 1975

[21] Appl. No.: 558,617

[52] U.S. Cl. .................. 361/45; 361/87; 361/102

[51] Int. Cl.² .......................... H02H 3/28

[58] Field of Search ............ 317/18 D, 18 R, 34, 317/27 R, 44, 45, 155.5, 137

[56] References Cited

UNITED STATES PATENTS

| | | | |
|---|---|---|---|
| 2,660,717 | 11/1953 | Hood | 317/18 D |
| 3,258,646 | 6/1966 | Fowler | 317/155.5 X |
| 3,555,360 | 1/1971 | Lee et al. | 317/18 D |
| 3,731,148 | 5/1973 | Fournis | 317/18 D |
| 3,737,726 | 6/1973 | Tarchaiski | 317/18 D |
| 3,787,709 | 1/1974 | Coe | 317/27 R X |
| 3,852,642 | 12/1974 | Engel et al. | 317/18 D |
| 3,895,263 | 7/1975 | Clark | 317/18 D |

OTHER PUBLICATIONS

"ABC's of Zener Diodes" by Turner, pp. 54–58, Scientific Library, 1974, Sams and Co.

Primary Examiner—J D Miller
Assistant Examiner—Patrick R. Salce
Attorney, Agent, or Firm—G. H. Telfer

[57] ABSTRACT

The sensing and trip circuit electronics of a ground fault interrupter of the differential current transformer type is, in a two pole system, supplied with power from each of the line conductors through separate solenoid trip coils and zener diodes that together provide good transient suppression while the zener diodes together provide full wave rectification for the voltage supplied to the electronics.

3 Claims, 1 Drawing Figure

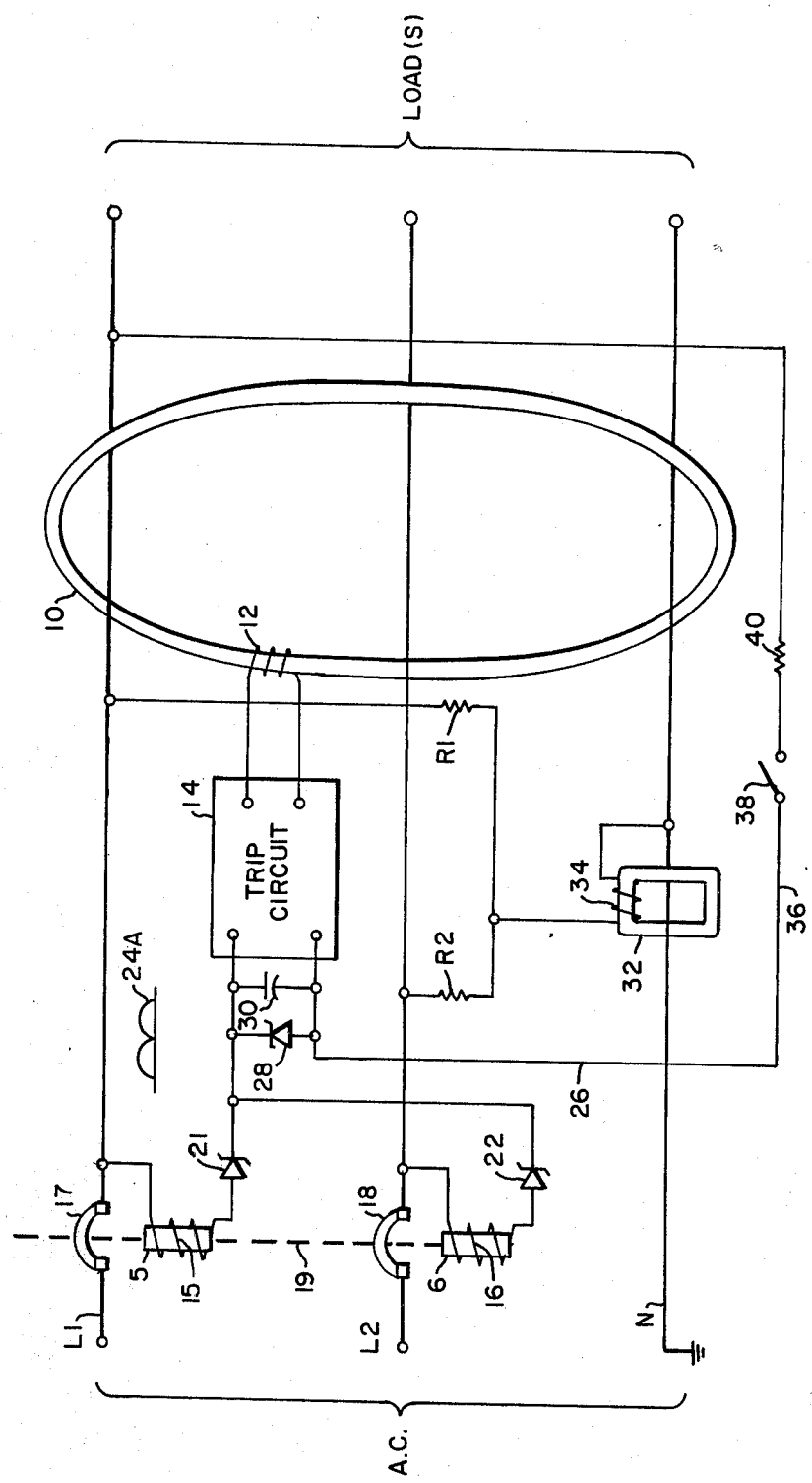

TWO POLE GROUND FAULT CIRCUIT INTERRUPTER WITH IMPROVED RECTIFIED SUPPLY AND TRANSIENT SUPPRESSION FOR A TRIP CIRCUIT

BACKGROUND OF THE INVENTION

This invention relates to ground fault interrupters of the differential current transformer type.

It has been recognized that the trip circuit electronics of ground fault interrupters needs to be protected against transient voltage surges that may appear on the line. In the case of two pole apparatus, such surges may occur on either one of the line conductors between it and ground or neutral or between the two line conductors. It has been known in the past in both single and multipole apparatus to employ the solenoid trip coil in the conductor from the line to the trip electronics and utilize its substantial impedance to help suppress transients. Since the trip electronics frequently requires an operating supply that is rectified, there have been used elements such as full wave rectifier bridges, each including four diodes, between the solenoid coil and trip electronics, or, in multipole systems, between each of the solenoid coils and the trip electronics.

In U.S. Pat. No. 3,852,642 by Engel et al there is disclosed a sensing amplifier and trip circuit utilizing a half wave rectified supply that may be provided in the case of a single pole system by a single diode rectifier. It was with the purposes of providing a two pole ground fault circuit interrupter utilizing the referred to type of trip circuit and providing good transient protection as well as simplicity and economy of components that the present invention came about.

SUMMARY OF THE INVENTION

In accordance with the present invention, the sensing and trip circuit electronics of a ground fault interrupter of the differential current transformer type is, in a two pole system, supplied with power from each of the line conductors through separate solenoid trip coils and zener diodes that together provide good transient suppression while the zener diodes together provide full wave rectification for the voltage supplied to the electronics.

Each zener diode half wave rectifies the line voltage from its respective line conductor and since those line voltages are 180° out of phase there is presented on a common line to the trip circuit a full wave rectified voltage. A third zener diode is connected from the line on which full wave rectified voltage appears to a point connected to the neutral conductor of the system and to another terminal of the trip circuit. The third zener diode provides additional transient suppression or voltage clipping.

BRIEF DESCRIPTION OF THE DRAWINGS

The single FIGURE of the drawing is a simplified circuit schematic of a two pole ground fault interrupter apparatus incorporating trip circuit power supply and transient suppression features in accordance with the present invention.

DESCRIPTION OF THE PREFERRED EMBODIMENT

Referring to the drawing, there are shown two power conductors L1 and L2 and a neutral conductor N of a three-wire AC power distribution system wherein each of the line conductors L1 and L2 support equal and opposite voltages such as in a 120/240 volt system. The neutral conductor N is grounded proximate the supply. The conductors L1, L2 and N pass through a magnetic core 10 of a differential current transformer as single turn primary windings and have terminals for connection to one or more loads. The core also has a secondary sensing winding 12 whose leads go to the sensing amplifier and trip circuit 14 for permitting a response by circuit breaker mechanisms 17 and 18 to current imbalances in the primary conductors that are indicative of a ground fault that may be harmful and result in opening conductors L1 and L2. Solenoid trip coils 15 and 16 are individually provided in association with breaker contacts 17 and 18 with one end of each connected to respective line conductors L1 and L2. The mechanism is connected together (dashed line 19) for concurrent operation of the breaker contacts on each of the line conductors. The other end of the trip coils 15 and 16 are connected to respective zener diodes 21 and 22 which are poled in same direction. As shown the two zener diodes 21 and 22 each have their anodes connected to the end of their respective trip coils 15 and 16 and their cathodes are connected together on line 24 and to a terminal of the trip circuit electronics. Additionally, a conductor 26 is connected to the neutral conductor N and to an additional terminal of the trip circuit electronics for providing power to the trip circuit for enabling its operation.

The two zener diodes 21 and 22 produce on the common line 24 the waveshape shown at 24A which is a full wave rectified voltage with the waveform returning to zero after each half cycle. Transients are limited by the impedances of both the trip coils 15 and 16 and the zener diodes 21 and 22 and also by a third zener diode 28 connected between the common branch 24 and the branch 26 connected to the neutral conductor. A capacitor 30 (e.g. 0.005 microf.) shown in parallel with the third zener diode 28 is as normally used at the input to trip circuits employed in ground fault interrupters and provides some noise filtering. It is not intended, however, in the preferred form of the invention, that the full wave rectified wave form be filtered to the extent that it significantly changes its shape since the trip circuit electronics in the preferred form as described in the abovementioned patent to Engel et al is one that requires return of the supply voltage to zero after each half cycle for advantages as are discussed therein.

Additionally, the apparatus comprises a grounded neutral transformer core 32 with a primary winding 34 that is connected through respective different valued resistors R1 and R2 to the line conductors L1 and L2 and whose secondary is the neutral conductor N. The purpose and nature of operation of the grounded neutral transformer is described more fully in commonly assigned copending application Ser. No. 558,618, filed Mar. 14, 1975 by Zakrzewski et al.

The apparatus also includes a test circuit branch 36 connected between a point on L1 on the load side of the differential transformer and a point on N on the supply side of both the differential transformer and the grounded neutral transformer. This branch includes a manually operable switch 38 and a resistor 40 for establishing a current flow to check the operability of both the differential current transformer 10 and the grounded neutral transformer 32. Further description of this portion of the apparatus is in commonly assigned application Ser. No. 417,659, filed Nov. 20, 1973 by J. J. Misencik. The particular nature of test circuit and grounded neutral protection are not critical to the present invention but those shown are preferred.

As opposed to prior known two pole ground fault circuit breakers, the apparatus of this invention avoids the necessity of full wave rectifier bridges each including four diodes and also provides improved transient voltage suppression between the various elements by use of the zener diodes for both rectification qualities and transient voltage suppression. Furthermore, the impedances of the solenoid trip coils 15 and 16 are utilized to limit transient magnitudes and effectively to offer dual impedances (with the zener diodes) for the discharge of the transient energy. While used as transient suppressing impedances in one function, the solenoid coils are also capable of three types of action upon the breaker mechanisms. The solenoid whose coil 15 is associated with L1 can disconnect its power conductor while disconnecting through the common trip mechanism 19 the adjacent breaker pole 18 on L2. Similarly the solenoid trip coil 16 associated with the conductor L2 works through the common trip mechanism 19 on the associated mechanism 17 of L1. Additionally, both poles may be acted upon to work simultaneously and to effect the separate disconnect action on their respective poles. Furthermore, the arrangement permits use of trip circuit electronics that have been successfully used in prior one pole versions of ground fault interrupters and is amenable to miniaturization.

The invention may be embodied in a variety of forms. A suitable structural arrangement of elements of a multipole ground fault interrupter circuit breaker is described in commonly assigned application Ser. No. 558,564, filed Mar. 14, 1975, by J. J. Misencik et al.

What is claimed is:
1. A two pole ground fault circuit interrupter comprising: a differential transformer core, a plurality of primary windings on said core, said plurality of primary windings including at least two line conductors and a neutral conductor of an AC electrical distribution system; a secondary sensing winding on said core for sensing current unbalance between said primary windings; means responsive to a predetermined sensed signal to open said line conductors and comprising a trip circuit having two terminals connected across said sensing winding, said means also comprising circuit breaker contacts and associated solenoids for each of said line conductors, each solenoid having a respective trip coil having one end connected to one of said line conductors, each of said coils having another end connected respectively to first and second like poled zener diodes, said first and second zener diodes having a common connection remote from said trip coils, said common connection being conductively connected to a third terminal of said trip circuit; a conductive circuit branch connecting a fourth terminal of said trip circuit to said neutral conductor, and a third zener diode connected between said conductive circuit branch and said common connection.

2. Ground fault circuit interrupter apparatus in accordance with claim 1 wherein: said circuit breaker solenoids are mutually interconnected for concurrent operation upon energization of one of said coils.

3. Ground fault circuit interrupter apparatus in accordance with claim 1 wherein: said trip circuit utilizes as an operating supply a full wave rectified voltage provided on said common connection.

* * * * *